United States Patent
Mall, Jr.

(10) Patent No.: US 12,305,686 B2
(45) Date of Patent: May 20, 2025

(54) SYSTEMS AND METHODS FOR INSPECTION OF FASTENERS IN AMUSEMENT PARK ATTRACTIONS

(71) Applicant: Universal City Studios LLC, Universal City, CA (US)

(72) Inventor: Howard Bruce Mall, Jr., Winter Springs, FL (US)

(73) Assignee: Universal City Studios LLC, Universal City, CA (US)

( * ) Notice: Subject to any disclaimer, the term of this patent is extended or adjusted under 35 U.S.C. 154(b) by 268 days.

(21) Appl. No.: 17/975,338

(22) Filed: Oct. 27, 2022

(65) Prior Publication Data
US 2024/0141944 A1    May 2, 2024

(51) Int. Cl.
| | |
|---|---|
| F16B 31/02 | (2006.01) |
| G01L 5/24 | (2006.01) |
| G06K 7/10 | (2006.01) |
| G06K 19/07 | (2006.01) |

(52) U.S. Cl.
CPC .............. F16B 31/025 (2013.01); G01L 5/24 (2013.01); G06K 7/10386 (2013.01); G06K 19/0723 (2013.01)

(58) Field of Classification Search
CPC .................................................... F16B 31/025
See application file for complete search history.

(56) References Cited

U.S. PATENT DOCUMENTS

| | | | |
|---|---|---|---|
| 4,453,644 A * | 6/1984 | Berglund ............... | B65D 41/44 |
| | | | 215/255 |
| 7,412,898 B1 * | 8/2008 | Smith ................... | F16B 31/025 |
| | | | 73/761 |
| 7,489,053 B2 | 2/2009 | Gentile et al. | |
| 9,097,037 B2 | 8/2015 | McKibben et al. | |
| 9,483,674 B1 | 11/2016 | Fink et al. | |
| 10,362,293 B2 | 7/2019 | Mesher | |
| 10,616,557 B2 | 4/2020 | Mesher | |
| 2005/0128087 A1 * | 6/2005 | Claessens ............ | G06Q 20/207 |
| | | | 340/687 |
| 2006/0180650 A1 * | 8/2006 | Claessens ........ | G06K 19/07749 |
| | | | 235/383 |
| 2007/0013521 A1 * | 1/2007 | Lindsay ............. | G06K 19/0716 |
| | | | 340/572.1 |
| 2019/0015731 A1 | 1/2019 | Doerksen et al. | |
| 2019/0156081 A1 * | 5/2019 | Pous ................. | G06K 19/0723 |

FOREIGN PATENT DOCUMENTS

| | | |
|---|---|---|
| CN | 110577771 A | 12/2019 |
| CN | 113007202 A | 6/2021 |
| CN | 217543862 U | 10/2022 |

OTHER PUBLICATIONS

PCT/US2023/035982 International Search Report and Written Opinion mailed Feb. 20, 2024.

* cited by examiner

Primary Examiner — Travis R Hunnings
(74) Attorney, Agent, or Firm — FLETCHER YODER PC (57) ABSTRACT

An attraction system includes a first component, a second component, a fastener configured to couple the first component to the second component, a radio frequency identification (RFID) tag including a torque stripe extending between the fastener and a reference point of the attraction system, wherein the RFID tag is configured to emit a radio frequency (RF) signal in response to the torque stripe being unbroken, and an RFID reader configured to detect the RF signal.

23 Claims, 4 Drawing Sheets

SYSTEMS AND METHODS FOR INSPECTION OF FASTENERS IN AMUSEMENT PARK ATTRACTIONS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks and other entertainment venues have a variety of features to entertain guests. For example, an amusement park may include an attraction system such as a ride (e.g., a roller coaster), a theatrical show, an extended reality system, and so forth. The attraction system may include a ride vehicle that transports guests of the amusement park throughout or within the attraction system, such as along a track, performing various operations that entertain the guests. During a lifetime of the attraction system, traditional monitoring and/or maintenance procedures may be employed to preserve integrity of various structural features of the attraction system. Unfortunately, traditional monitoring and/or maintenance procedures may be expensive and take an excessive amount of time. Accordingly, it is now recognized that improved monitoring and maintenance of attraction systems is desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an attraction system comprises a first component, a second component, a fastener configured to couple the first component to the second component, a radio frequency identification (RFID) tag comprising a torque stripe extending between the fastener and a reference point of the attraction system, wherein the RFID tag is configured to emit a radio frequency (RF) signal in response to the torque stripe being unbroken, and an RFID reader configured to detect the RF signal.

In an embodiment, a system comprises a torque stripe positioned over a fastener that connects portions of a track of an attraction system, wherein the fastener is tightened to a torque corresponding to a target torque, an RFID tag comprising the torque stripe and configured to emit a signal while the torque stripe is continuous, and an RFID reader configured to determine that the torque corresponds to the target torque in response to detecting the signal emitted by the RFID tag.

In an embodiment, a method comprises detecting, via an RFID reader, a radio frequency (RF) signal emitted by a radio frequency identification (RFID) tag comprising a torque stripe extending between a fastener and a reference point of an attraction system such that the torque stripe completes a circuit formed by the RFID tag. In addition, the method may comprise determining, via the RFID reader and in response to the RFID tag failing to transmit an additional RF signal to the RFID reader, that the torque stripe is broken and generating, via the RFID reader and in response to determining that the torque stripe is broken, an electronic notification indicating a fault mode corresponding to the fastener.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to an attraction system of an amusement or theme park. The attraction system may include a roller coaster, an amusement ride, a theatrical show, an interactive experience, and so forth. For example, the attraction system may include a ride vehicle where guests may be positioned. During operation of the attraction system, the ride vehicle may move along a track (e.g., a rail) to impart a movement sensation (e.g., a gravitational force, an inertial force, a postural adjustment) on the guests to provide entertainment. The track of the attraction system may be formed of various parts (e.g., support columns, track support beam, track rail) that are held together with fasteners, such as nut and bolt assemblies, screws, or other types of fasteners. Other aspects of the attraction system may also employ fasteners.

During the construction and/or maintenance of the attraction system, the fasteners described above may be tightened to a target torque level (e.g., above a threshold torque or within a target torque range). If any of the fasteners have loosened (e.g., untightened, or released torque) from the target torque level, the track may exhibit undesirable effects, such as relatively strong vibrations when it is traversed by the ride vehicle. Thus, it may be desirable to perform inspections of the fasteners of the track, and/or other fasteners associated with the attraction system, to determine whether one or more of the fasteners are loose and/or require maintenance (e.g., tightening). However, existing approaches for performing inspection of fasteners of an attraction system may be inefficient and cumbersome. Thus, it is presently recognized that improving inspection of attraction system fasteners may improve efficient operation of the attraction system.

Accordingly, embodiments of the present disclosure are directed to systems and techniques for automated (e.g., fully or partially automated) inspection of the fasteners of the attraction system, such as fasteners corresponding to a track of the attraction system. In an embodiment, the system may include a torque stripe that is formed over a fastener and a portion of the track or other reference point (or over two portions of the same fastener) such that the torque stripe is unbroken when the fastener is properly tightened (e.g., tightened to a target torque level). For example, the torque stripe may include a strip of conductive ink formed over a head of the fastener (e.g., a screw) and the track portion adjacent to the head of the fastener (e.g., after the fastener is tightened to a target torque). In an embodiment, the strip of conductive ink may be formed over one or more layers of non-conductive material (e.g., plastic, rubber), formed over the head of the fastener and the track portion (e.g., to prevent electrical current traveling though the strip from possibly dissipating into the environment). In other words, one or more layers of non-conductive material may be employed to electrically insulate the conductive ink from other conductive componentry.

In another embodiment, the torque stripe may include a strip of conductive ink formed over a nut of a fastener and a bolt of the fastener. The torque stripe may complete a circuit corresponding to a radio frequency identification (RFID) transmitter assembly (referred to in certain instances of the present disclosure as an "RFID tag") that includes an RFID integrated circuit (e.g., an RFID chip, a processor and a memory) of the RFID tag and communication circuitry (e.g., an antenna) of the RFID tag. Accordingly, a radio-frequency (RF) signal may be emitted from the RFID tag (e.g., via the antenna) if the torque stripe is preserved in its original configuration (e.g., the torque stripe is unbroken or continuous). Further, an RFID reader may be employed to detect the RF signal transmitted by the RFID tag (e.g., via the antenna) when the torque stripe is intact. However, if the torque stripe is not in its original configuration (e.g., the torque stripe is broken due to the fastener loosening or being damaged), the RF signal from the RFID tag may not be transmitted (e.g., via the antenna) and, thus, may not be received by the RFID reader. In this way, the torque stripe may act as a switch in the RFID tag.

In an embodiment, the techniques for inspection of the fasteners of the track may include applying a torque stripe made of conductive ink over the fastener (e.g., after the fastener is fastened to a target torque level) and a portion of the track, such that the torque stripe completes the circuit formed by the RFID tag (e.g., the integrated circuit or chip, the torque stripe, and the antenna) connecting the RFID integrated circuit with the antenna. In an alternative embodiment, the torque stripe may be formed over two portions (e.g., a nut and a bolt) of the same fastener (e.g., after the fastener is fastened to a target torque level) such that the torque stripe completes the circuit formed by the RFID tag connecting the RFID integrated circuit with the antenna. If, for example, the torque level is reduced over time due to vibration and so forth, the torque stripe will be broken when the components over which the torque stripe extends loosen and move with respect to one another. Thus, the RFID tag will no longer produce a signal. The techniques may further include using an RFID reader to detect the RF signal from RFID tags and, based on an indication that one or more RF signals is not received, triggering maintenance or a manual inspection of the track.

Figure 1:
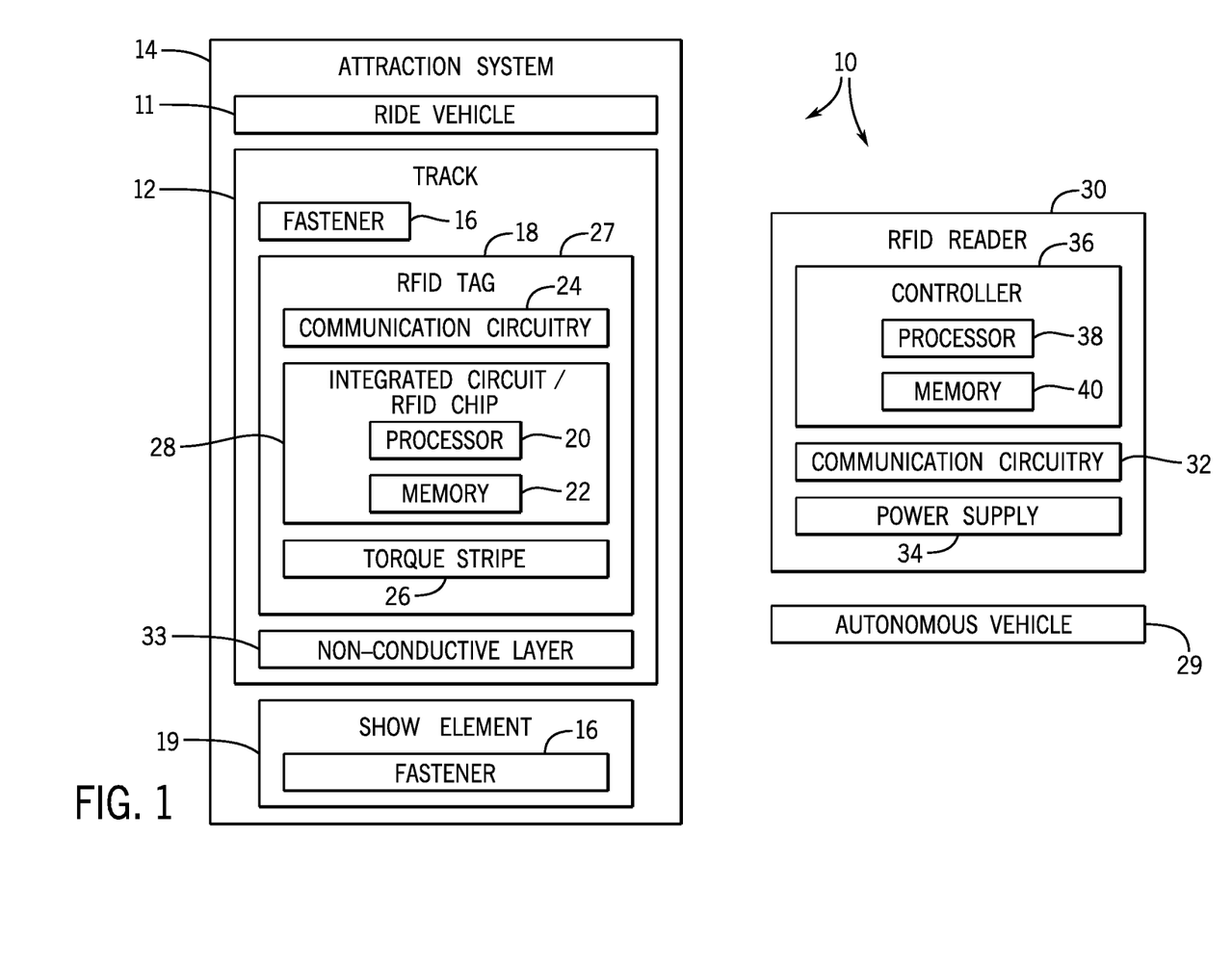
FIG. 1 is a block diagram of an attraction system and an inspection system for inspecting aspects of the attraction system, in accordance with an aspect of the present disclosure.
Figure 2:
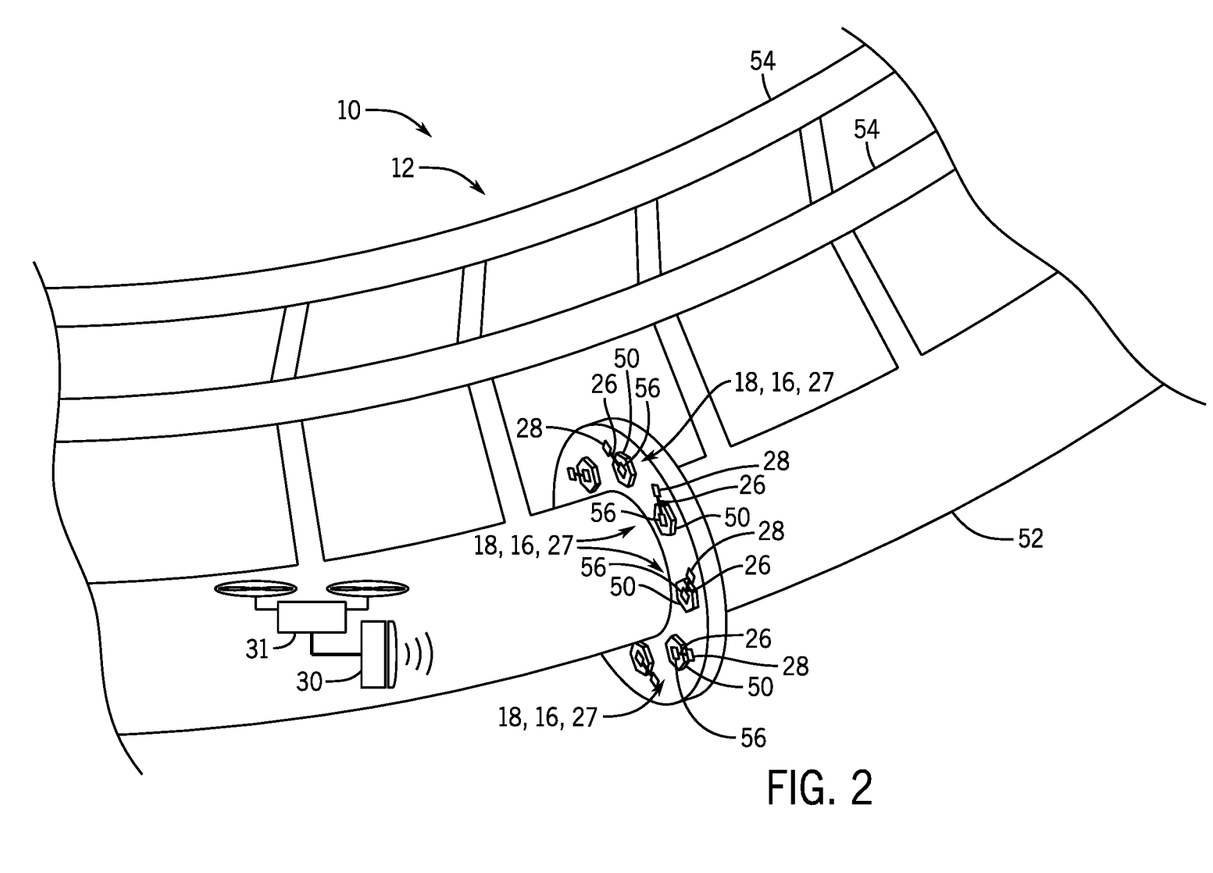
FIG. 2 is a schematic diagram of a track of the attraction system of FIG. 1, and the inspection system for inspecting aspects of the track of the attraction system of FIG. 1, in accordance with an aspect of the present disclosure.

With the preceding in mind, FIG. 1 is a block diagram of an inspection system 10 for a track 12 of an attraction system 14. The attraction system 14 (e.g., a roller coaster, an amusement ride, an interactive show, an immersive experience, etc.) may include a track 12 and may be operable to entertain one or more guests. The track 12 (e.g., ride track, roller coaster track, rail, guide) may support a ride vehicle 11 carrying passengers (e.g., guests of the amusement park) though the attraction system 14. The track 12 may include fasteners 16 (e.g., structural fasteners), such as nut and bolt assemblies, screws, or other fasteners that may hold various parts of the track 12 together. For example, the track 12 may include a track support beam that is made of several segments. The segments of the track support beam may be joined together using nut and bolt assemblies, as shown in FIG. 2. In another example, the track support beam may be fastened using screws to the track support columns that hold the track 12 off the ground. Further, while fastener inspection techniques are discussed in the context of fasteners 16 employed on the track 12 in certain instances of the present disclosure, it should be understood that the same or similar fastener inspection techniques may be applied in the context of fasteners 16 employed at other areas of the attraction system 14, such as those employed on a show element 19 that may not be traversed by the ride vehicle 11.

During construction and/or maintenance of the track 12, the fasteners 16 may be tightened (e.g., using a torque wrench) to a target torque level (e.g., above a threshold torque, within a target torque range, etc.). To maintain the structural integrity of the track 12 and keep the track 12 in a good operating condition, the fasteners 16 may need to stay fastened to the target torque level. However, the fasteners 16 may loosen over time due to various factors, such as vibrations of the track 12 due to traversal of the ride vehicle 11, ambient temperature changes, and/or aging of the fasteners 16 and/or the track 12. If the fastener 16 loosens, the fastener 16 may twist out and the torque of the fastener 16 may decrease from the target torque level. This may lead to undesirable effects, such as a high level of vibrations when the track 12 is being traversed by the ride vehicle 11, a decrease of the lifespan of the track 12, and/or other undesirable effects.

To facilitate automatic detection of loosened instances of the fasteners 16 on the track 12, the track 12 may include RFID tags 18 (or "RFID transmitter assemblies") that are associated with the fasteners 16 and arranged to emit radio frequency (RF) signals when the associated fasteners 16 are fastened to the target torque level. For example, one RFID tag 18 may be associated with one nut and bolt assembly and may emit a particular RF signal as long as the fastener 16 is fastened to a particular torque level. The RFID tag 18 may include a processor 20 and a memory 22 (referred to in certain instances of the present disclosure as an "RFID chip" or integrated circuit 28), communication circuitry 24 (e.g., including an antenna), and a torque stripe 26. The memory 22 of the RFID tag 18 may include volatile memory, such as random access memory (RAM), and/or non-volatile memory, such as read-only memory (ROM), optical drives, hard disc drives, solid-state drives, or any other non-transitory computer-readable medium that includes instructions for transmission of the data associated with the RFID tag 18, among other things. For example, the memory 22 may store an identification number, object identifier, password, and/or error detection code that may uniquely identify a particular fastener 16 associated with a particular RFID tag 18. The processor 20 may be operable to execute the instructions. For example, the processor 20 may include one or more application-specific integrated circuits (ASICs), one or more field programmable gate arrays (FPGAs), one or more general purpose processors, or any combination thereof. The processor 20 may execute the instructions to continuously or periodically generate and emit an RF signal via the communication circuitry 24 (e.g., the antenna).

The communication circuitry 24 of the RFID tag 18 may include an antenna that may receive and/or transmit radio-frequency (RF) signals. The communication circuitry 24 may transmit the RF signal (also referred herein to as "signal") that specifies a unique identifier of the associated fastener 16. For example, each fastener 16 or group of fasteners 16 may have a unique identifier that is encoded in the signal and transmitted by the RFID tag 18. This signal can be used to determine whether the associated fastener 16 is fastened to the target torque level. In an embodiment, the RFID tag 18 may be powered by energy of the radio waves emitted from the RFID reader 30 and received though the communication circuitry 24 of the RFID tag 18. In this case, the RFID tag 18 may only emit the signal indicating that the fastener 16 is fastened if the RFID tag 18 first receives an interrogation signal from the RFID reader 30. In an embodiment, the RFID tag 18 may be powered by a power supply such as a battery (e.g., Li-ion battery) or a solar panel, or through a connection to an electrical grid. In this case, the communication circuitry 24 may transmit the RF signal without first receiving an interrogation signal from the RFID reader 30, and the RF signal may be stronger (e.g., as compared to the signal emitted in response to an interrogation signal) making the signal more easily detectable by the RFID reader 30.

The torque stripe 26 may be a part of a circuit 27 (e.g., electrical circuit) formed by the RFID tag 18 and may connect the processor 20 and the memory 22 with the communication circuitry 24 (or specifically, the antenna of the communication circuitry 24). In an embodiment, the torque stripe 26 may act as an electrical switch for the RFID tag 18, thereby enabling the RFID tag 18 to function (e.g., transmit an RF signal) only when the switch is closed or the torque stripe 26 is unbroken. The torque stripe 26 may be formed of conductive ink (or of another conductive material) over the fastener 16 (or over the fastener 16 and the track 12) in such a way that a deviation in the fastener torque from the target torque level may break the torque stripe 26 and the RFID tag 18 circuit. For example, the torque stripe 26 may be formed over the head of the fastener 16 and a portion of the track 12 in which the fastener 16 is embedded. In an embodiment, the strip of conductive ink may be formed over one or more layers 33 of non-conductive material (e.g., plastic, rubber, resin) formed over the head of the fastener 16 and the track portion (e.g., to prevent electrical current traveling though the strip from possibly dissipating into the environment). Additionally, or alternatively, the fastener 16 and/or the portion of the track 12 near the fastener 16 may be non-conductive. The non-conductive material may be deformable (e.g., stretchable) such that a change in the configuration of the fastener 16 (e.g., loosening from the target torque) may cause the non-conductive material to deform possibly breaking the torque stripe 26.

If a portion of the fastener 16 turns (e.g., a torque is reduced), the torque stripe 26 may separate into two disjoined parts. Thus, if the torque stripe 26 is broken, the RFID tag 18 may not emit the above-described RF signal (e.g., due to communication circuitry 24, or antenna thereof, being disconnected from the processor 20 and/or the memory 22).

In an embodiment, the torque stripe 26 may be configured to allow for a range of motion (e.g., threshold extension distance, threshold force applied) of the fastener 16 before the torque stripe 26 breaks. In this embodiment, the torque stripe 26 may be formed of a relatively elastic conductive material that, while adhering to the surface over which it is formed, may stretch to a certain extent before breaking. For example, the torque stripe 26 may break if the range of motion (e.g., displacement, movement, rotation) exceeds a certain threshold. Additionally, or alternatively, the torque stripe 26 may be a wire that does not necessarily adhere to a surface. Such a torque stripe 26 made of a wire may be attached to the fastener 16 at a first point and attached to the track 12 at a second point.

To receive signals from the RFID tag 18 (and, in some embodiments, transmit signals to the RFID tag 18), the RFID reader 30 may include a communication circuitry 32 such as an antenna. For example, the communication circuitry 32 may send an interrogation signal to the RFID tag 18 (e.g., the signal that may trigger an emission of a signal from the RFID tag 18), and receive the signal from the RFID tag 18 that indicates the fastener 16 is fastened to the target torque level. In addition, the RFID reader 30 may include a power supply 34, such as a battery that may enable the RFID reader 30 to operate (e.g., send interrogation signals, receive signals from the RFID tag 18, and/or process the received signals). The RFID reader 30 may also include a controller 36 comprising a processor 38 and a memory 40. The memory 40 may include volatile memory, such as random access memory (RAM), and/or non-volatile memory, such as read-only memory (ROM), optical drives, hard disc drives, solid-state drives, or any other non-transitory computer-readable media that includes instructions. The processor 38 may be operable to execute such instructions. For example, the processor 38 may include one or more application specific integrated circuits (ASICs), one or more field programmable gate arrays (FPGAs), one or more general purpose processors, or any combination thereof. In an embodiment, the instructions may enable the RFID reader 30 to process the RF signals from the RFID tags 18 and to determine whether any of the fasteners 16 on the track 12 has loosened and if so, which fastener 16 has loosened. Once the data contained in the RF signal from the RFID tag 18 has been processed, the controller 36 may generate a notification indicating the condition of the track 12 (e.g., a fault mode, such as an undesirable loosening, corresponding to one of the fasteners 16). In some embodiments, the notification may be transmitted to an electronic device, such as a remote electronic device, an electronic device dedicated to the attraction system 14, etc.

The inspection system 10 may be implemented in a variety of ways. For example, a single RFID tag 18 may be associated with a single fastener 16 or with a group of fasteners 16. Additionally or alternatively, the RFID reader 30 may be mounted onto an autonomous vehicle 29 that autonomously traverses the track 12. Additionally or alternatively, the RFID reader 30 may be handheld by a user (e.g., a maintenance staff), or integrated with a drone 31. Additionally or alternatively, the torque stripe 26 of the RFID tag 18 may be applied in various ways to different types of fasteners 16. For example, the torque stripe 26 may be drawn over a head of the fastener 16 (e.g., a bolt) and a portion of the track 12, or the torque stripe 26 may connect a nut on the fastener 16 (e.g., nut on a bolt) and the thread of the fastener 16 (e.g., thread of a bolt).

One example of a possible implementation of the inspection system 10 in FIG. 1 is shown in FIG. 2. FIG. 2 is a schematic diagram of the track 12 of the attraction system 14 of FIG. 1, and various aspects of the inspection system 10 employed for inspecting aspects of the track 12 of the attraction system 14 of FIG. 1. In the illustrated embodiment, multiple instances of the torque stripe 26 are employed. Each torque stripe 26 is formed over the head (e.g., flattened top portion) of a corresponding fastener 16 (e.g., bolt) and a corresponding portion of the track 12. A support beam 52 of the track 12 supports the track rails 54 and includes two segments joined together by the fasteners 16 (e.g., nut and bolt assemblies). An antenna 56 may be positioned over each bolt head 50 of each fastener 16. The integrated circuit 28 of the RFID tag 18 may be positioned on the track 12 near each bolt head 50. The torque stripe 26 that connects the integrated circuit 28 (or "RFID chip") of the RFID tag 16 and the antenna 56 (e.g., corresponding to the communication circuitry 24 in FIG. 1) of the RFID tag 18 may be formed over the bolt head 50 and the portion of the track 12. In the illustrated embodiment, the each torque stripe 26 is whole (e.g., unbroken, intact) and each RFID tag 18 may thus emit an RF signal. The RFID reader 30 in the illustrated embodiment may be configured to detect the RF signal from the RFID tag 18. As shown, the RFID reader 30 may be attached to a drone 31, which may allow for inspecting portions of the track 12 that are high off the ground and/or otherwise not immediately accessible for manual inspection.

Figure 3:
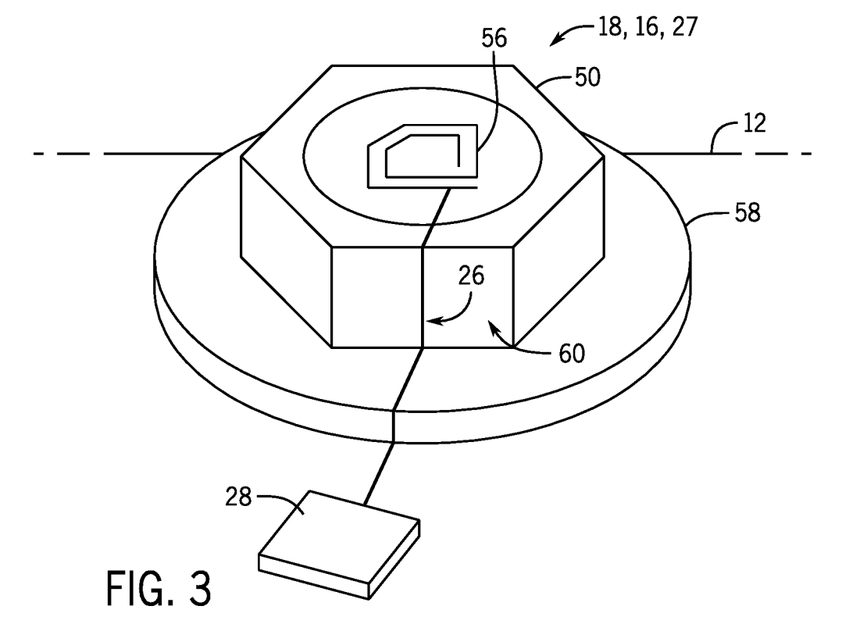
FIG. 3 is a schematic diagram of a radio frequency identification (RFID) transmitter assembly (or "RFID tag") employed in the inspection system of FIG. 1 for monitoring a fastener assembly of the attraction system of FIG. 1, where the RFID transmitter assembly includes an unbroken torque stripe indicating that the fastener assembly includes a torque corresponding to a target torque, in accordance with an aspect of the present disclosure.
Figure 4:
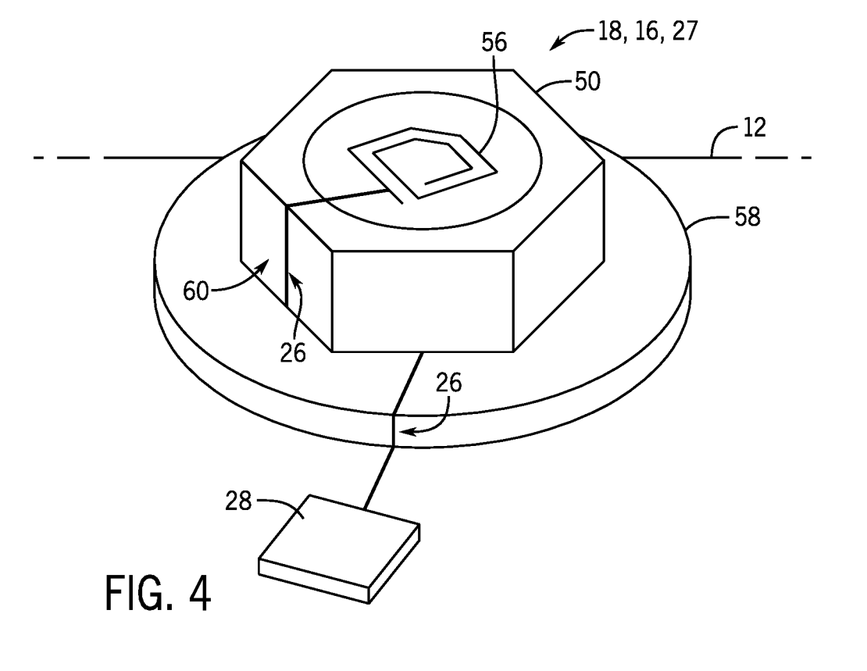
FIG. 4 is a schematic diagram of a radio frequency identification (RFID) transmitter assembly (or "RFID tag") employed in the inspection system of FIG. 1 for monitoring a fastener assembly of the attraction system of FIG. 1, where the RFID transmitter assembly includes a broken torque stripe indicating that the fastener assembly includes a torque deviating from a target torque, in accordance with an aspect of the present disclosure.

A close-up view of one of one of the RFID tags 18 of FIG. 2 and the associated fastener 16 (e.g., in a tightened state) is shown in FIG. 3, and a close-up view of one of the RFID tags 18 of FIG. 2 and the associated fastener 16 (e.g., in a loosened state) is shown in FIG. 4. FIG. 3 and FIG. 4 illustrate a comparison between the RFID tag 18 configurations that may emit an RF signal and that may not emit RF signal, respectively.

FIG. 3 is a schematic diagram of the RFID tag 18 positioned over a portion of the track 12 of FIG. 1 and a bolt head 50 of a fastener 16 that is tightened at the target torque level. In the illustrated embodiment, the torque stripe 26 connects (e.g., electrically connects) the antenna 56 that is positioned on the bolt head 50 and the integrated circuit 28 that is positioned on the track 12. As illustrated, the torque stripe 26 may adhere to the surfaces (e.g., the bolt head 50 and the track 12) over which it is formed. Thus, the torque stripe 26 may run over the top of the bolt head 50, down the side of the bolt head 50, over a washer 58 (e.g., the washer 58 may be placed between the bolt head 50 and the track 12 to distribute the pressure from the bolt head 50 to a greater surface area of the track 12), over the side of the washer 58, and over the track 12, as shown. Other arrangements are also possible, such as those without the washer 58. In addition, as discussed, the torque stripe 26 may run over one or more layers 33 of non-conductive material such plastic, rubber, etc. As discussed, alternative placements of the antenna 56, the integrated circuit 28, and/or the torque stripe 26 are possible. For example, the antenna 56 may be placed onto the track 12 and the integrated circuit 28 may be placed on the bolt head 50. In another example, the RFID tag 18 may be placed on the under-side of the nut and bolt assembly such that the torque stripe 26 runs over the nut and over the thread of the bolt. In this case, the antenna 56 and the integrated circuit 28 may be placed on the threaded portion of the bolt and the nut, respectively. It may be appreciated that the torque stripe 26 may not necessarily be a straight line. For example, both the antenna 56 and the integrated circuit 28 may both be positioned on the bolt head 50 such that the torque stripe 26 forms a U-shape connecting the integrated circuit 28 with the antenna 56, and following a path from the bolt head 50 to the track 12 and back to the bolt head 50.

FIG. 4 is a schematic diagram of the RFID tag 18 positioned over a portion of the track 12 of FIG. 1 and a bolt head 50 of a bolt that has been loosened from the target torque level. As shown, loosening of the bolt, which involves turning the bolt about its axis, may result in displacement of the edge 60 of the bolt head 50. The displacement of the edge 60 of the bolt head 50 may pull the torque stripe 26 apart creating a discontinuity in the torque stripe 26, as shown. It may be appreciated that the torque stripe 26 may be formed of a relatively inelastic, electrically conductive material (e.g., conductive ink) that adheres to surfaces in order to break or sever due to turning of the bolt head 50. As discussed, severing of the torque stripe 26 breaks the circuit 27 formed by the RFID tag 18, thereby preventing the RFID tag 18 from emitting the RF signals.

Figure 5:
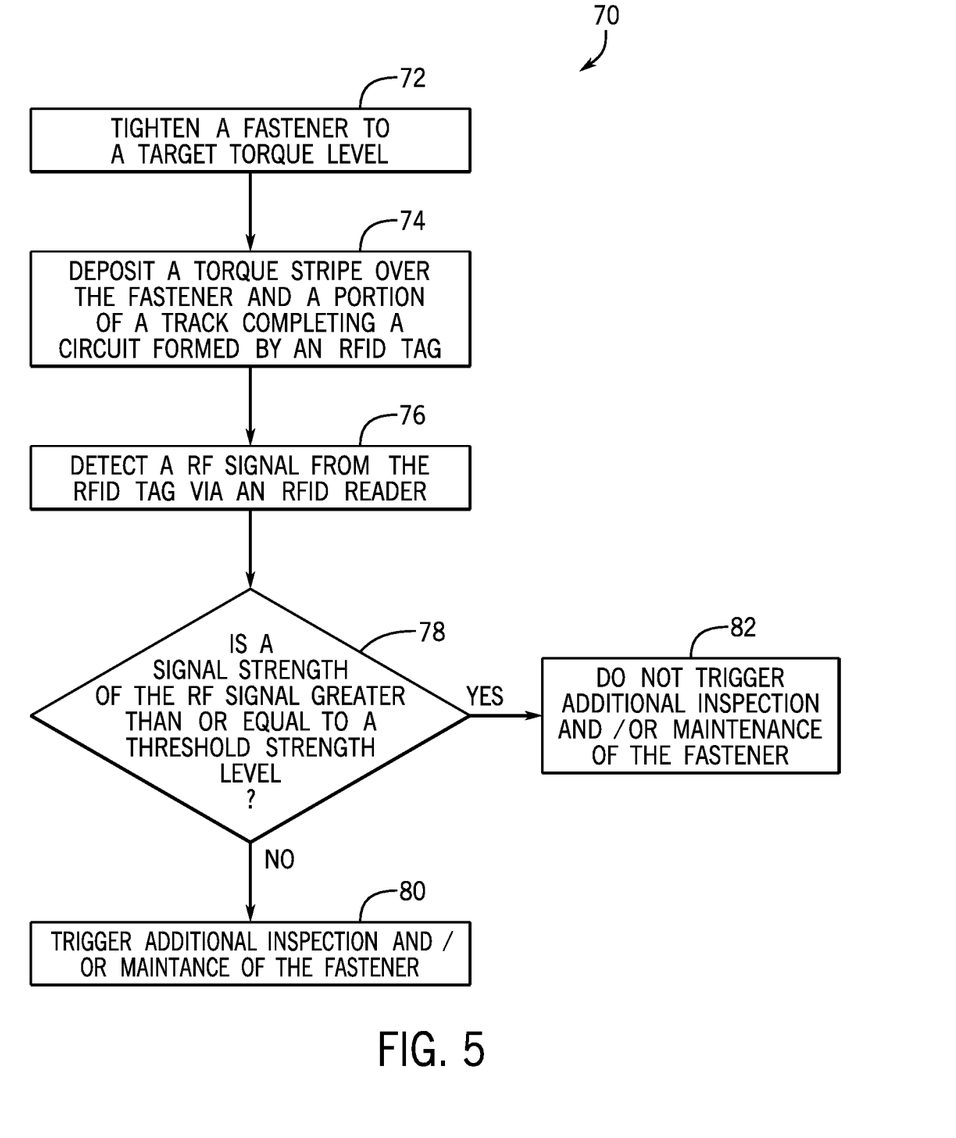
FIG. 5 is a flow diagram of a process for detecting loosened fasteners using the inspection system of FIG. 1, in accordance with an aspect of the present disclosure.

FIG. 5 is a process 70 for detecting loosened fasteners 16 using the inspection system 10 of FIG. 1. It should be noted that reference numerals of the features provided below are illustrated in various embodiments of FIGS. 1-4. The process 70 begins with tightening (block 72) a fastener 16 to a target torque level (e.g., above a threshold torque or within a target torque range). As discussed, during construction and/or maintenance of the track 12, the fasteners 16, such as nut and bolt assemblies, are tightened to the target torque level. The target torque level may be specified by engineers who designed the track 12 and may be maintained to ensure the stability and longevity of the track 12. The tightening the fastener 16 to the target torque level may involve gradually turning the fastener 16 with a torque wrench and measuring the torque of the fastener 16 until the fastener 16 has reached the target torque level.

Once the fastener 16 has been tightened to a target torque level, the process 70 may include forming (block 74) a torque stripe 26 over the fastener 16 and a portion of a track 12 completing a circuit 27 formed by an RFID tag 18. Other formation of the torque stripe 26 is also possible, such as forming the torque stripe 26 over a movable (e.g., rotatable) portion of the fastener 16 and an immovable (e.g., non-rotatable) portion of the fastener 16 (or some other reference point). Forming the torque stripe 26 may involve depositing a strip of conductive ink that completes a circuit 27 formed by the RFID tag 18. In an embodiment, the RFID tag 18, including the antenna 56, the integrated circuit 28 (or "RFID chip"), and the torque stripe 26, may be pre-fabricated and deposited over the fastener 16 and the track 12 by an autonomous vehicle 29 traversing the track 12. In an embodiment, the torque stripe 26 may not be pre-fabricated and may be 'drawn' by the autonomous vehicle 29 using an application tool such as a brush or a roller. In an embodiment, the torque stripe 26, and possibly other portions of the circuit 27 formed by the RFID tag 18, may be hand drawn by a user (e.g., maintenance personnel). It should be appreciated that different components of the RFID tag 18 (e.g., antenna 56, the integrated circuit 28, and the torque stripe 26) may be formed by different processes, and deposited on the track 12 by different methods and different times. In addition, forming (block 74) a torque stripe 26 over the fastener 16 may include forming one or more layers 33 of non-conductive material over the fastener 16 and/or the track 12. The non-conductive layer 33 may be applied as a coating or as patches or stickers. For example, a non-conductive coating may be applied to the fastener 16 and the track 12 prior to the formation of the torque stripe 26 and the RFID tag 18. In another example, an RFID tag 18 may be formed over a non-conductive sticker and the non-conductive sticker with the RFID tag 18 may be placed over the track 12 and the fastener 16 such that the torque stripe 26 extends over both the track 12 and the fastener 16.

The process 70 may include detecting (block 76) a signal from the RFID tag 18 via a RFID reader 30. As discussed, the RF signal from the RFID tag 18 may be transmitted in response to the RFID tag 18 receiving an interrogation signal from the RFID reader 30. Alternatively, the RFID tag 18 may include a power supply which may enable the RFID tag 18 to emit a signal on its own (e.g., continuously, periodically, etc.). Regardless of the source of power for the signal transmission, the RF signal may only be transmitted if the torque stripe 26 is intact (e.g., if the fastener 16 has not turned or otherwise been loosened from the target torque level). Indeed, if the fastener 16 has turned (e.g., loosened), the displacement of its edge 60 may result in the breaking of the torque stripe 26 and the interruption of the circuit 27 formed by the RFID tag 18. In addition, there may be an intermediate case where the fastener 16 has turned slightly such that the torque stripe 26 may be thinned but not completely severed. In this case, the signal strength from the RFID circuit may also be reduced, and the loosening of the fastener 16 may be detected.

The process 70 may include determining (block 78) whether the RF signal from the RFID tag 18 is greater than or equal to a threshold strength level. This may involve receiving the signal via the communication circuitry 32 (e.g., antenna) of the RFID reader 30, determining the strength of the RF signal via the controller 36 (e.g., processor 38 and memory 40) of the RFID reader 30, and comparing the strength of the RF signal to the threshold strength level via the controller 36 of the RFID reader 30. The threshold strength level may correspond to the minimum strength of the RF signal that can be detected at a certain distance from the RFID tag 18 when the torque stripe 26 is whole (e.g., the fastener 16 has not lost any torque). If the signal strength of the RF signal is greater than or equal to the threshold strength level, then additional inspection (e.g., manual inspection) and/or maintenance of the fastener 16 is not triggered (block 82). If, on the other hand, the strength of the RF signal is less than the threshold strength level, then additional inspection (e.g., manual inspection) and/or maintenance of the fastener 16 may be triggered (block 80). The strength of the signal being below the threshold strength level may be an indication that the torque stripe 26 has been severed or is about to sever due to displacement of a portion of the fastener 16 relative to the track 12.

Additionally, or alternatively, the process 70 may include additional criteria for triggering additional inspection and/or maintenance of the fastener 16. For example, the RFID tag 18 may not emit RF signals as frequently and/or as reliably if the torque stripe 26 is damaged. Thus, the RFID reader 30 may receive a series of several RF signals from the RFID tag 18 and if the number of RF signals in the series is less than a threshold number of signals, trigger additional inspection and/or maintenance of the fastener 16. Maintenance of the fastener 16 may include fastening the fastener 16 to the target torque level and/or replacing the fastener 16 if it has been damaged. The maintenance of the fastener 16 may be performed manually by a user (e.g., maintenance personnel) or robotically via an autonomous vehicle 29 that may traverse the track 12. Further, maintenance of the fastener 16 may include replacing the torque stripe 26 and/or other components of the RFID tag 18 having the torque stripe 26.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An attraction system, comprising:
   a first component;
   a second component;
   a fastener configured to couple the first component to the second component; and
   a radio frequency identification (RFID) tag comprising an RFID chip, an antenna, and a torque stripe extending from the RFID chip to the antenna and between the fastener and a reference point of the attraction system, wherein the antenna is configured to emit a radio frequency (RF) signal in response to the torque stripe being unbroken.

2. The attraction system of claim 1, wherein the torque stripe is configured to break in response to a torque of the fastener deviating from a target torque.

3. The attraction system of claim 1, wherein the torque stripe comprises a conductive ink.

4. The attraction system of claim 1, wherein the RFID chip comprises processing circuitry, memory circuitry, or both.

5. The attraction system of claim 1, wherein the antenna is disposed on the fastener or at the reference point.

6. The attraction system of claim 1, wherein the first component or the second component comprises the reference point.

7. The attraction system of claim 1, comprising:
an RFID reader configured to detect the RF signal; and
an autonomous vehicle on which the RFID reader is disposed, wherein the autonomous vehicle is configured to traverse a track of the attraction system.

8. The attraction system of claim 1, comprising:
an RFID reader configured to detect the RF signal; and
a drone on which the RFID reader is disposed.

9. The attraction system of claim 1, comprising a track having the first component, the second component, or both.

10. The attraction system of claim 1, comprising:
a plurality of fasteners including the fastener and an additional fastener;
a plurality of RFID tags including the RFID tag and an additional RFID tag corresponding to the additional fastener; and
an RFID reader configured to:
determine, based on detecting the RF signal and failing to detect an additional RF signal corresponding to the additional RFID tag, that the fastener is properly fastened and that the additional fastener is not properly fastened; and
transmit a notification identifying the additional fastener and indicating that the additional fastener is not properly fastened.

11. The attraction system of claim 1, wherein the torque stripe comprises a conductive ink, and the attraction system comprises one or more layers of non-conductive material configured to electrically insulate the conductive ink from conductive componentry of the attraction system.

12. A system, comprising:
a torque stripe at least partially positioned over a fastener that connects portions of a track of an attraction system, wherein the fastener is tightened to a torque corresponding to a target torque; and
an RFID tag comprising the torque stripe, an RFID chip, and an antenna configured to emit a radio frequency (RF) signal while the torque stripe is continuous, wherein the torque stripe extends from the antenna to the RFID chip while the torque stripe is continuous.

13. The system of claim 12, comprising an RFID reader configured to determine that the torque corresponds to the target torque in response to detecting the RF signal emitted by the antenna, and configured to determine that the torque deviates from the target torque in response to the RFID tag failing to emit the RF signal to the RFID reader.

14. The system of claim 12, wherein the torque stripe comprises conductive ink.

15. The system of claim 12, wherein the torque stripe is configured to break in response to the torque deviating from the target torque.

16. The system of claim 12, comprising:
a plurality of fasteners including the fastener and an additional fastener;
a plurality of RFID tags including the RFID tag and an additional RFID tag corresponding to the additional fastener; and
an RFID reader configured to:
determine, based on detecting the RF signal and failing to detect an additional RF signal corresponding to the additional RFID tag, that the fastener is properly fastened and that the additional fastener is not properly fastened; and
transmit a notification identifying the additional fastener and indicating that the additional fastener is not properly fastened.

17. The system of claim 12, wherein the torque stripe comprises a conductive ink, and the system comprises one or more layers of non-conductive material configured to electrically insulate the conductive ink from conductive componentry of the system.

18. A method, comprising:
detecting, via a radio frequency identification (RFID) reader, a radio frequency (RF) signal emitted by an RFID tag comprising an RFID chip, and antenna configured to emit the RF signal, and a torque stripe extending between a fastener and a reference point of an attraction system and from the RFID chip to the antenna such that the torque stripe completes a circuit formed by the RFID tag;
determining, via the RFID reader and in response to the RFID tag failing to transmit an additional RF signal to the RFID reader, that the torque stripe is broken; and
generating, via the RFID reader and in response to determining that the torque stripe is broken, an electronic notification indicating a fault mode corresponding to the fastener.

19. The method of claim 18, comprising forming the torque stripe extending between the fastener and the reference point of the attraction system and from the RFID chip to the antenna such that the torque stripe completes the circuit between the RFID chip and the antenna of the RFID tag.

20. The method of claim 18, comprising generating, via the RFID reader and in response to determining that the torque stripe is broken, the electronic notification indicating that the fault mode corresponds to a torque of the fastener deviates from a target torque.

21. The method of claim 18, comprising tightening the fastener to couple a track component corresponding to a first component of the attraction system with a second component of the attraction system such that a torque associated with the fastener corresponds to a target torque.

22. The method of claim 18, comprising transmitting, via the RFID reader, an interrogation signal that is configured to power the RFID tag.

23. The method of claim 18, comprising including, in the electronic notification, an identification distinguishing the fastener from an additional fastener of the attraction system.

* * * * *